United States Patent
Shi et al.

(10) Patent No.: US 9,076,271 B2
(45) Date of Patent: Jul. 7, 2015

(54) MACHINE OPERATION MANAGEMENT

(75) Inventors: Dongfeng Shi, Nottingham (GB); Charles Dibsdale, Bristol (GB); Richard C. T. Douglas, Derby (GB); Toby Clarke, Derby (GB); Peter Shone, Nottingham (GB); William Puglia, Smichov (CZ)

(73) Assignee: OPTIMIZED SYSTEMS AND SOLUTIONS LIMITED, Derbyshire (GB)

( * ) Notice: Subject to any disclaimer, the term of this patent is extended or adjusted under 35 U.S.C. 154(b) by 818 days.

(21) Appl. No.: 13/379,196

(22) PCT Filed: Jun. 8, 2010

(86) PCT No.: PCT/EP2010/058003
§ 371 (c)(1),
(2), (4) Date: Feb. 24, 2012

(87) PCT Pub. No.: WO2011/003688
PCT Pub. Date: Jan. 13, 2011

(65) Prior Publication Data
US 2012/0150491 A1    Jun. 14, 2012

(30) Foreign Application Priority Data
Jul. 8, 2009   (GB) .................................. 0911836.5

(51) Int. Cl.
*G06F 11/30*   (2006.01)
*G07C 3/00*    (2006.01)
*G05B 23/02*   (2006.01)

(52) U.S. Cl.
CPC .............. *G07C 3/00* (2013.01); *F05B 2260/80* (2013.01); *G05B 23/0235* (2013.01)

(58) Field of Classification Search
CPC .... G07C 3/00; G05B 23/0235; F05B 2260/80
USPC ........................................................ 702/184
See application file for complete search history.

(56) References Cited

U.S. PATENT DOCUMENTS

| | | | | |
|---|---|---|---|---|
| 4,642,782 A * | 2/1987 | Kemper et al. | ................. | 706/53 |
| 4,901,247 A * | 2/1990 | Wakimoto et al. | .............. | 706/52 |
| 5,081,598 A | 1/1992 | Bellows et al. | | |
| 5,625,574 A * | 4/1997 | Griffiths et al. | ............... | 702/183 |
| 6,910,364 B2 * | 6/2005 | Girbig | ........................... | 73/1.27 |

FOREIGN PATENT DOCUMENTS

EP         0 170 515 A2    2/1986

OTHER PUBLICATIONS

Aug. 3, 2010 International Search Report issued in International Patent Application No. PCT/EP2010/058003.

* cited by examiner

*Primary Examiner* — John Breene
*Assistant Examiner* — Eyob Hagos
(74) *Attorney, Agent, or Firm* — Oliff PLC

(57) ABSTRACT

A method for managing machine operation comprising sensing a plurality of operational variables for a machine during use thereof so as to generate operational data for said variables. The operational data is processed so as to determine features within the operational data which are indicative of a divergence from a desired operational state of the machine. Confidence values associated with said features are determined and used to assess whether the plurality of features and associated confidence values are indicative of a predetermined diagnosis for said machine. A confidence value for said diagnosis is determined based upon the associated feature confidence values and used to generate a signal indicative of an operational state of the machine. The invention may be used for engine health monitoring applications and may be used for determining necessary servicing or repair work for the engine.

13 Claims, 4 Drawing Sheets

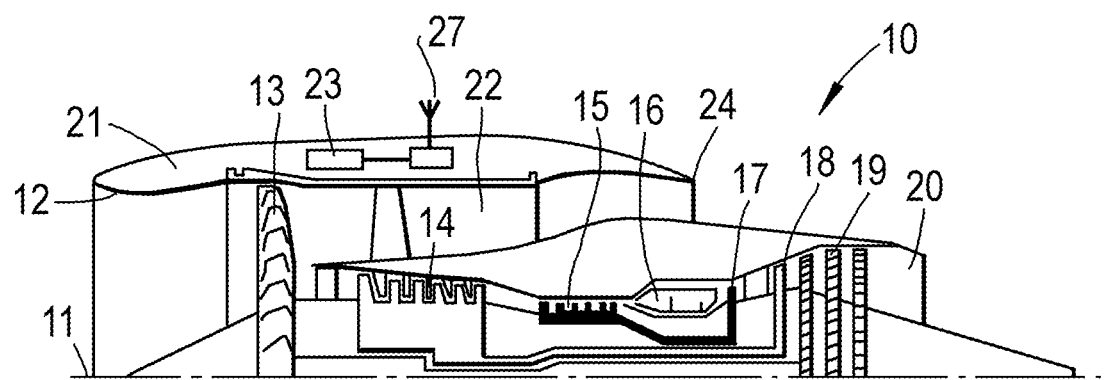
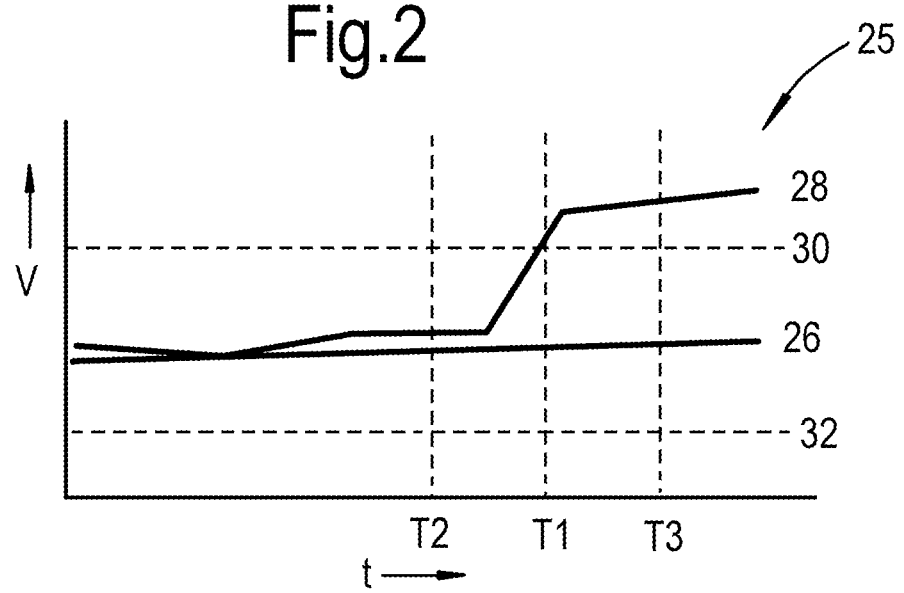

MACHINE OPERATION MANAGEMENT

The present invention relates to a system, method and associated tool for machine operation regulation and more particularly, although not exclusively, to the use of operation diagnosis and prognosis tools for determining required repair or servicing of equipment, such as gas turbine engines.

Conventional Equipment Health Monitoring (EHM) techniques make use of sensors mounted relative to the equipment to capture readings of parameters which reflect the operational performance thereof. In the example of a gas turbine engine, a multitude of sensors are mounted to various engine components to measure operational parameters such as, for example, temperature, velocity, flow rate, rotational speed, torque, distance, stress or deflection within an engine or one or more of its components.

Such parameters may be measured at prescribed time increments or at predetermined equipment states during operation and stored for communication to a monitoring unit which may be located on a vehicle or remotely thereof. A significant volume of data may be amassed during operation, which is processed to determine existing or predicted faults. The resulting fault information may be communicated to an organisation, entity or division responsible for supporting, maintaining or designing the equipment such that it can be taken into account within a planning process for equipment maintenance, scheduling, operational planning or equipment improvement by way of design changes or modifications.

Conventional EHM techniques review the data derived from the sensor readings to determine anomalous features within the data. The features determined for one variable are compared with corresponding data for one or more other sensed variables to derive a diagnosis. Incidents of such features are written to a table which is used to assess possible faults.

A problem exists with the processing of such data in that there may exist multiple possible explanations for a deviation in any given parameter. Accordingly, multiple combinations of parameters must be considered in order to determine an accurate diagnosis. In addition, any fault may have a secondary impact on other parameters, causing other anomalies which may obfuscate a diagnosis. In general, the purpose of diagnosis in an EHM situation is to determine if the equipment is in a 'potentially failed state' or not, and to isolate the failure mode being experienced such that the appropriate remedial actions may be recommended. However the isolation of the failure mode being suffered is often problematic in view of the multiple possible combinations of parameters and symptoms which may be shared there-between.

Conventional diagnosis techniques require extensive tabulation of data and creation of rule-based scripts to define how a diagnosis is made from the arrays of data. The process of configuring a diagnosis or updating an existing diagnosis can be long and complicated and requires specialist skills and understanding of the system.

Furthermore, conventional techniques offer limited data fusion to cater for data derived from multiple data sources and have been found to have limited scalability due to the need to have multiple instances of the same data features. Accordingly, the certainty of the diagnosis provided may be questionable if certain data sources are omitted from consideration. Without detailed working knowledge of the diagnosis methodology, any such failures of the diagnosis tools may appear random and inexplicable and may reduce confidence in the tool. In the case of vehicle engines and in particular gas turbine engines, a false diagnosis can represent a serious safety risk in that potential or existing faults could go undetected.

It is an aim of the present invention to provide an improved tool and associated method for diagnosing operating conditions of one or more machines and thereby regulating operational use, servicing, repair or product improvement thereof.

According to one aspect of the present invention there is provided a method for managing machine operation comprising: sensing a plurality of operational variables during use of the machine so as to generate operational data for said variables; processing said operational data so as to determine features within the operational data indicative of a divergence from a desired operational state; determining a confidence value associated with said features; assessing whether said features and one or more associated confidence value are indicative of a predetermined diagnosis for said machine; and outputting a signal indicative of an operational state of the machine if a diagnosis is determined.

According to one embodiment, the method comprises determining a confidence value for said diagnosis based upon the associated feature confidence value. The method may further comprise outputting said signal indicating an operational state of the machine if the diagnosis confidence value exceeds a threshold diagnosis confidence In one embodiment, the system involves the definition of a network relationship structure between said features and said diagnoses. The features and diagnoses may be represented as nodes within said network structure and links may be formed there-between to identify which features impact on which diagnoses.

According to one embodiment, the network relationship structure comprises three types of elements or nodes, which may comprise features, symptoms and diagnoses. Symptoms may be linked with, or determined from, features. Diagnoses may be linked with, or determined from, symptoms. The network may comprise a plurality of tiers, which may alternatively described as layers or levels. Each level may comprise only one of features, symptoms or diagnoses.

The confidence value associated with one or more features may be used to determine a confidence value for a single symptom associated therewith. The confidence value associated with one or more symptoms may be used to determine a confidence value for a single diagnosis associated therewith. The feature confidence values may provide an input for determining symptom confidence values. The symptom confidence values may provide an input for determining the diagnosis confidence value. A feature confidence value may not be used for direct determination of a diagnosis confidence value without determining a symptom confidence value.

A many-to-many relationship may be established between symptoms and diagnoses and/or between features and symptoms. Single instance of any of a feature, symptom or diagnosis may link to many other elements. The ability to create one instance of a feature symptom or diagnosis, enabled by the many-to-many structure may offer a key advantage of scalability of the system. Only one instance of a node may need to be managed for version control. In contrast, traditional rule-based systems are based on a one-to-many structure which may require many instances of features or symptoms, which makes them less scalable, less intuitive and more difficult to version control.

In assessing whether a plurality of features and associated confidence values are indicative of a predetermined diagnosis for said machine, the plurality of feature confidence values may be used to determine one or more symptom confidence values. The one or more symptom confidence values may be used to determine a diagnosis confidence value.

Confidence values for any or any combination of features, symptoms and/or diagnoses may be determined based on predetermined thresholds. Feature confidence values may be determined based upon any or any combination of operational variable rate of change, predetermined or maximum or minimum values for the operational variable, and/or the results of statistical modelling or analysis of the operational variable. Multiple tests or criteria may be used to determine the confidence value for a single feature.

The determination of any or any combination of a feature, symptom and/or diagnosis confidence value may comprise definition of a time range or period value associated with said feature, symptom or diagnosis. Any features or symptoms occurring within the time period prescribed for another feature or symptom may be considered related for the purpose of determining an associated diagnosis. The combination of such features may be considered in the determination of a corresponding diagnosis confidence value.

In one embodiment, the processing said operational data comprises scanning for features related to operational variables which occur within a predetermined time period of each other. A time offset value may be recorded for temporally spaced features. The time offset value may be used in the determination of a corresponding symptom or diagnosis confidence value. In order to obtain a continuous range of confidence, the offset of the confidence value may be set to the mean, and the range may be set to a distribution (such as, for example, Poisson, Weibul, chi, or other known distributions). This enables the 'probability' that a feature may present in relation to others within a time range.

The operational variables may comprise any or any combination of temperature, flow rate, torque, velocity, stress, distance, dimension, clearance and/or deformation of or over a machine or component or portion thereof. Operational variables may be sensed at predetermined time increments. The operational data processed in accordance with the present invention may be a subset or sample of the total operational data gathered during use of said machine for a given time period. The operational data may be transmitted for processing at a location remote from the machine.

The invention may be used for engine or other equipment health monitoring applications and may be used for determining necessary servicing or repair work, operational planning, or product improvement for the equipment.

According to a second aspect of the present invention, there is provided a tool for diagnosis or prognosis of machine operation characteristics comprising: processing means arranged for data communication with a plurality of sensors, said sensors arranged to record a plurality of operational variables during use of a machine so as to generate machine operational data for said variables; the processing means arranged to receive said machine operational data and comprising machine readable instructions for: controlling the processing of said operational data so as to determine features within the operational data indicative of a divergence from a desired operational state; determining a confidence value associated with said features; assessing whether a plurality of features and associated confidence value are indicative of a predetermined diagnosis for said machine; and outputting a signal indicative of an operational state of the machine if a diagnosis is determined.

The processing means may determine a confidence value for said diagnosis based upon the associated feature confidence values. The processing means may further output a signal indicative of an operational state of the machine dependent on the diagnosis confidence value.

According to a third aspect of the present invention, there is provided a data carrier comprising machine readable instructions for controlling operation of one or more processors to perform the processing steps of the first or second aspects.

According to a fourth aspect of the invention, there is provided a method or system for determining and/or scheduling servicing, maintenance or repair work, operational planning or product improvement for a machine in accordance with the first aspect.

Any or any combination of the optional features described with reference to the first aspect may be applied to the second, third or fourth aspects.

Whilst the methods and tools defined above are particularly applicable to complex and/or safety-critical machinery such as gas turbine engines, it will be appreciated that such techniques, or simplified tools or systems derived there-from, may also be applied to other forms of machinery, such as automotive and marine engines, other propulsion equipment, plant machinery, power generation equipment and/or machining equipment. The potential applicability of this invention is to be construed accordingly.

One or more working embodiments of the present invention are described in further detail below by way of example with reference to the accompanying drawings, of which:

FIG. 1 shows a half section of a gas turbine engine to be monitored in accordance with the present invention;

FIG. 2 shows a plot of an exemplary parameter over time to be used in accordance with the present invention;

Figure 3:
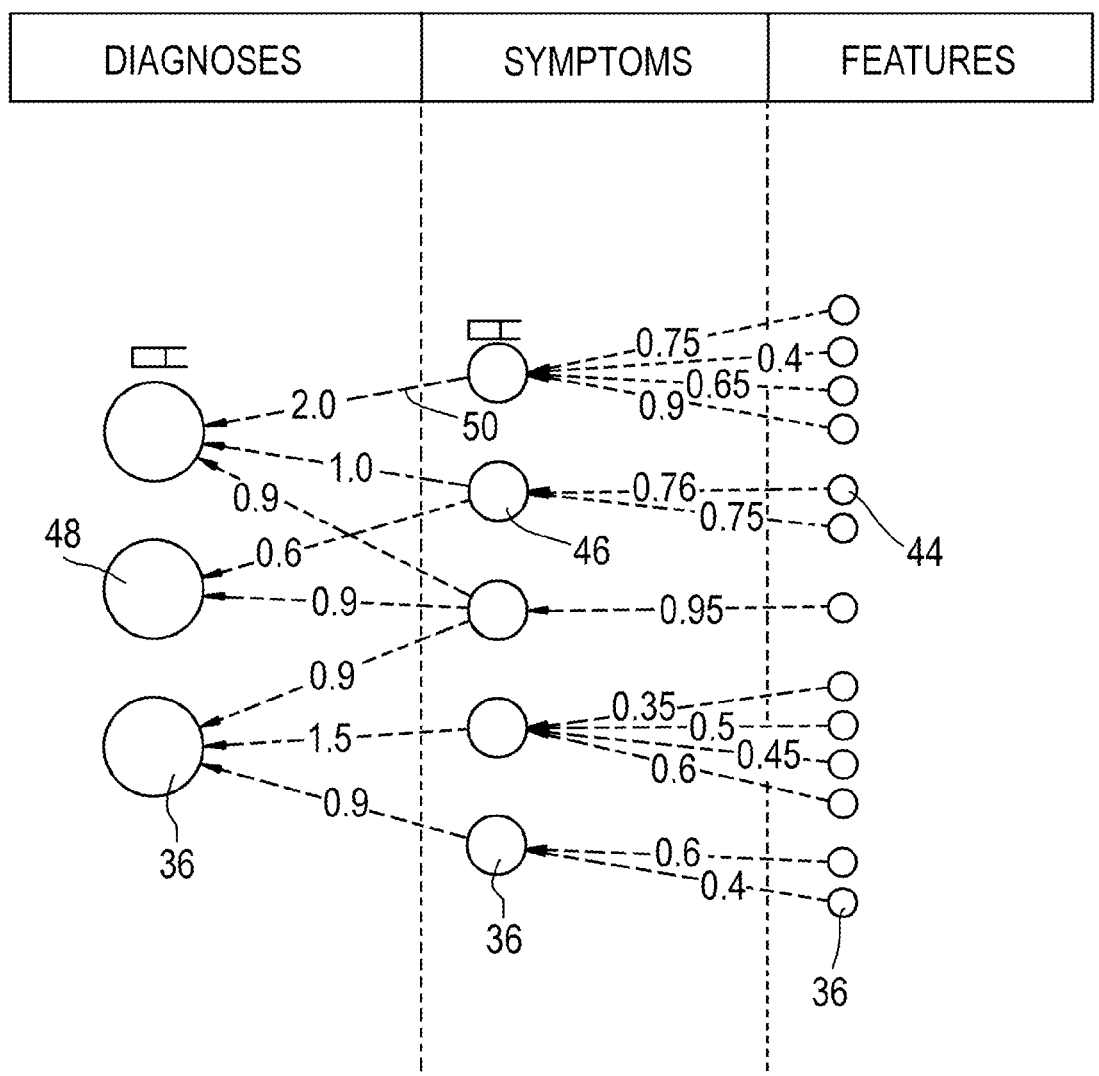
FIG. 3 shows a schematic of the information structure used in the diagnosis of machine operation in accordance with one embodiment of the present invention.

The present invention provides for method, tool and associated system for diagnosing conditions associated with the operation of a machine in a straightforward and understandable manner. The diagnosis output by the present invention may be used to establish maintenance, servicing or repair work required for the machine in question and the scheduling thereof.

FIG. 1 shows an example of a machine which may be monitored in accordance with the present invention. Whilst the following description proceeds with reference to a gas turbine engine in particular, it will be appreciated that there is a variety of other types of engine or equipment, which represent important functioning assets of an organisation and to which the present invention is applicable. Such examples typically include machinery but need not be limited as such.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 24.

The gas turbine engine 10 works in a conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engines may have a two, rather than three, shaft configuration such that the function of the intermediate and high pressure compressors is combined on a single spool. Other gas turbine engines may have greater or lesser bypass flow ratios; may substitute the ducted fan 13 for an unducted propeller; or else may avoid a bypass altogether such that all compressed air passes through the combustion equipment.

Multiple sensing devices are mounted at various locations throughout the gas turbine engine to various engine components. Such sensors may measure parameters such as, for example: fluid, component or combustion equipment temperatures; fluid pressure and/or velocity; rotational speeds and/or torque for one or more shafts, fans, turbines or compressors; clearances between rotating and stationary components; stresses and deflection in components; fuel, coolant and/or lubricant flow rates.

Rates at which sensor readings are taken may be decided in accordance with the engine control strategy and the criticality of the operating parameter being sensed. For example, certain readings may be taken a one second intervals or multiple times per second, whilst less critical variable readings may be taken at longer time intervals. In addition, the rate at which readings are taken may be varied according to the flight phase or other conditions. In one embodiment, readings may be taken at constant rates which exceed the requirements of the present invention and may be sampled in order to avoid the need to handle excessive volumes of data.

An engine monitoring unit (EMU) 23 is mounted on the engine 10, for example within the Nacelles or core engine casing. The monitoring unit receives data from the sensors by wired or wireless data connections. The EMU may process the data in accordance with the invention as described below. However in this embodiment, the EMU 23 is connected to a transmitter 27 which is arranged to transmit the gathered data or else a subset thereof to a remote receiver either during or else after a flight. There are numerous examples of systems for transmitting data in this manner within the art and the details thereof are not discussed here for conciseness.

The data is received by a remote receiver and transmitted to a monitoring or control centre, typically via the internet. The control centre comprises a server, a data store and one or more processing stations for processing of the received engine data in accordance with the present invention.

Turning now to FIG. 2, there is shown a plot 25 of a generic operational variable, 'V', over time. The values of the variable under inspection may be determined from data obtained from one or more sensors in engine 10. Line 26 shows a predicted or normal plot of values for variable V, whilst line 28 shows the actual plot determined from sensor readings during operation of the engine 10.

The first stage in the diagnosis process involves the determination of so-called 'features' within the data derived form the sensors or else within a plot 25 derived there-from. A feature is representative of an event occurring within the machine, or component thereof, being monitored. The feature may take one or more of many forms dependent on the operational parameter being monitored. Examples of such features are described with reference to the plot 28 in FIG. 2. In this example, the change in a variable over time ($\Delta V$) is monitored to determine whether a feature has occurred.

In FIG. 2, a maximum and minimum threshold for variable V are shown respectively as dotted lines 30 and 32. In this example, an event giving cause for concern has occurred due to the monitored variable V falling outside of the region bounded by the maximum 30 and minimum 32 thresholds. In this case the variable exceeds the maximum threshold at time T1 and results in a feature being recorded. A feature would also occur if variable V fell below the minimum threshold 32.

Another example of the determination of a feature is in the event that the change in the variable $\Delta V$ exceeds predefined bounds or thresholds. For example if $\Delta V$ increases or decreases by more than a threshold percentage between time T2 and T1 as shown in FIG. 2, then a feature may be recorded. Rates of change in V which give cause for concern are represented by a steep or step-like change in the variable plot 25.

In this manner a number of different types of feature may be defined for different variables. FIG. 2 represents a simplistic example and other types of feature may be defined based on more detailed modelling techniques and/or data analysis. For example, aerodynamic, thermodynamic and/or stress modelling may be used to determine criteria which are indicative of a feature.

The sensor data is analysed or otherwise processed to determine whether a feature has occurred. As described above, a number of different tests or criteria may be used to determine whether or not the feature has occurred or else is a cause for concern. Using this information, a confidence value is assigned to the feature. The confidence value may be based upon the number of the total possible criteria fulfilled for determination of the feature.

In a simplified example, in which two different criteria are used to assess a feature, the determination of only one of those criteria may result in a 50% confidence level, whereas the determination of both criteria may result in a 100% confidence level. The confidence value may thus be determined based on the number or ratio of feature criteria fulfilled from the total number of criteria indicative of a feature.

Additionally or alternatively, the confidence value may be determined based upon the degree to which one or more criteria are met or exceeded. For example, in FIG. 2, if the variable V falls only marginally outside of the maximum 30 or minimum 32 thresholds, a relatively low confidence value may be determined, whereas a higher confidence value may be assigned if the variable falls outside of said thresholds by a greater margin.

It will be appreciated that in real life scenarios, there are a large number of factors which may affect the confidence value for different parameters. Such factors may have a greater or lesser impact on the confidence dependent on the actual parameter under investigation. Furthermore data and/or information affecting the confidence values may derive from a number of sources. The diagnostic tool is designed to fuse together data from such sources in order to summarise the available information as a single confidence value.

Turning now to FIGS. 3 to 6, there is described a method for processing the features and associated confidence values by entering said information for a plurality of sensed operational parameters into a relational network or structure as shown in FIG. 3.

In FIG. 3 there is shown a hierarchical relational information structure 34 in which a plurality of nodes 36 are defined. The nodes 36 are grouped into three hierarchical levels, namely a feature banding 38, a symptoms banding 40 and a diagnoses banding 42, each of which contains respective feature nodes 44, symptom nodes and diagnosis nodes 48. Each node 36 provides a representation of an associated feature, symptom or diagnosis, dependent on the node type. The network comprises a plurality of links represented by lines 50 which define which features 44 impact on which symptoms 46 and which symptoms impact on a diagnosis 48.

Figure 5:
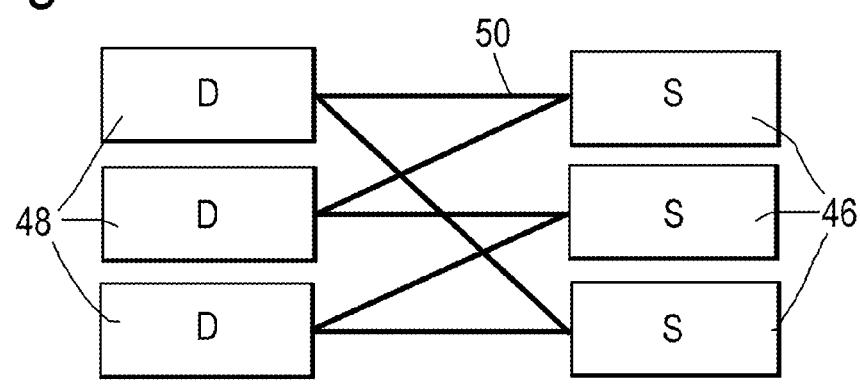
FIG. 5 shows the inter-relationship between diagnoses and symptoms according to a preferred embodiment of the present invention.

The structure 34 may in its simplest form comprise a single diagnosis node 48 which is linked with a single symptom node 26, which is in turn linked with a single feature node 44. However in a real scenario a plurality of features may impact on a single symptom and a plurality of symptoms may impact on a single diagnosis. Turning to FIG. 5, there is shown the possible relationships which may exist between diagnosis nodes 48 and symptom nodes 46. The tool allows for a many-to-many relationship therebetween. That is to say that a single diagnosis node may link to a plurality of symptom nodes 46 and a plurality of diagnosis nodes 48 may also link to a common or shared symptom node 46. Accordingly the structure can be considered to be a node network. Whilst the structure is hierarchical in the sense that the levels of features, symptoms and diagnoses have been defined, it is not to be confused with the alternative meaning of 'herarchical' which would imply that only a one-to-many or tree structure can be defined. In contrast, the many-to-many structure of this embodiment provides significantly greater flexibility in the manner in which scenarios can be modelled.

A similar relationship modelling strategy may be used between symptom nodes 48 and feature nodes 44. Using such a strategy, only a single instantiation of each feature, symptom and diagnosis is required, which as the added benefit that the network is easily scalable. However it can be seen in the example of FIG. 3 that the model provides for multiple features impacting on a single symptom only. This is in part due to the diagrammatic complexity which can arise is symptoms share common features. Accordingly, in this case, the graphical representation of feature nodes are repeated for each symptom where they impact on multiple symptoms.

Each node 36 has associated therewith data representative of the corresponding feature, symptom or diagnosis. Such data may comprise the node name, the node type, details of other nodes linked thereto, associated weightings and/or other data as will be described in further detail below.

Figure 4:
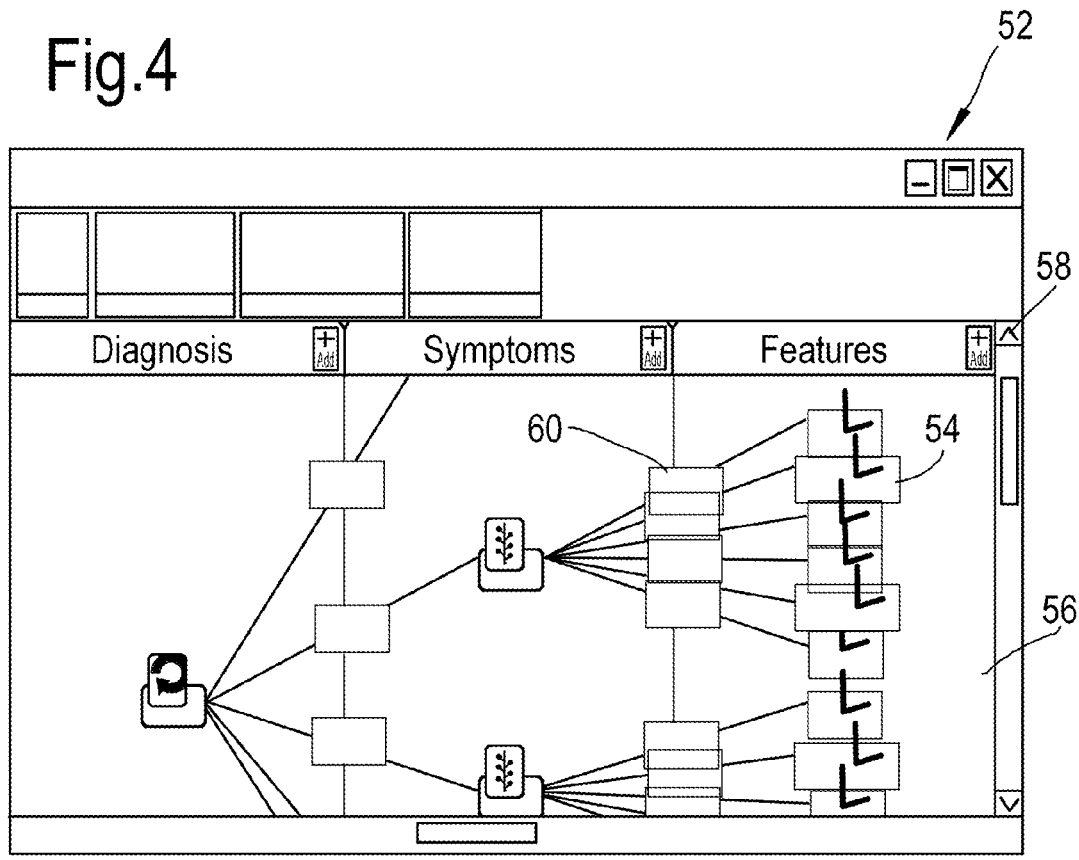
FIG. 4 shows a screen shot of one embodiment of a user interface for a diagnosis tool implementing the structure of FIG. 3.

The network structure 34 may be created by a user using a graphical user interface 52, an example of which is shown in FIG. 4. The graphical user interface 52 provides a graphical representation of each node in the form of an icon 54. The interface has a network display region 56 which is divided into feature, symptom and diagnosis regions. The user interface 52 comprises user controls 58 by which a user can add diagnosis, symptom, or feature nodes 54 to the graphical structure. The user controls allows the user to input or recall information associated with the node. In addition the user interface allows a user to link nodes together so as to form the relationships there-between.

When populating the data associated with a feature, for example, a user may enter or call up details of the statistical modelling or test applied to the relevant parameter data in order to determine the feature at hand. Such data may comprise or be associated with graphical data representative of the tested conditions. By way of example, in the embodiment shown, feature may be at least in part defined by the results of a rolling average, such as an exponentially weighted moving average; a statistical hypothesis test, such as a t-test; or any other statistical function or test, including scaling, grouping or pairing thereof.

In addition to establishing, the network structure 34, the graphical user interface also allows for validation, review and amendment of the structure.

For each feature and associated confidence value, the diagnostic tool also makes use of one or more time-related values. The time related values comprise a time range and time offset values, represented at 60, which are used in the determination of whether one or more features are indicative of a symptom within the machine being monitored.

The inventors have determined that features associated with a symptom or diagnosis may not occur at the same time and accordingly features are associated with a time range or period. In this manner other features occurring within the predetermined time period of a first feature may be associated with the first feature when determining whether a common symptom exists for said features. This is represented diagrammatically in FIG. 2, where a feature occurring at time T1 may have a time period associated therewith which starts at T2 and ends at T3.

Accordingly any other features occurring within the time period T2-T3 may be considered in conjunction with the feature at T1 to determine whether said combination is indicative of a recognised symptom. By taking account of the temporal dimension, the certainty and hence usefulness of the diagnosis can be increased.

Figure 7:
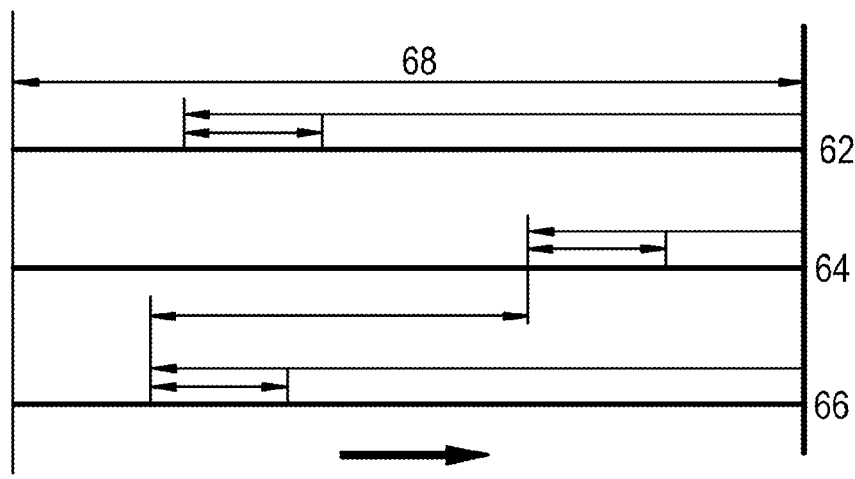

Turning now to FIG. 7, there is shown a timeline for three different features 62, 64 and 66 occurring at different times within time period 68. In order to be able to combine and compensate for the different features which may be generated at different points in time within the defined time period 68, a time offset value is defined to summarise the features during the user-defined time period. The features are retrieved from maximal points of offset across all features. The summary logic is reconfigurable and applied across its own offset and time period as shown in FIG. 7.

Figure 6:
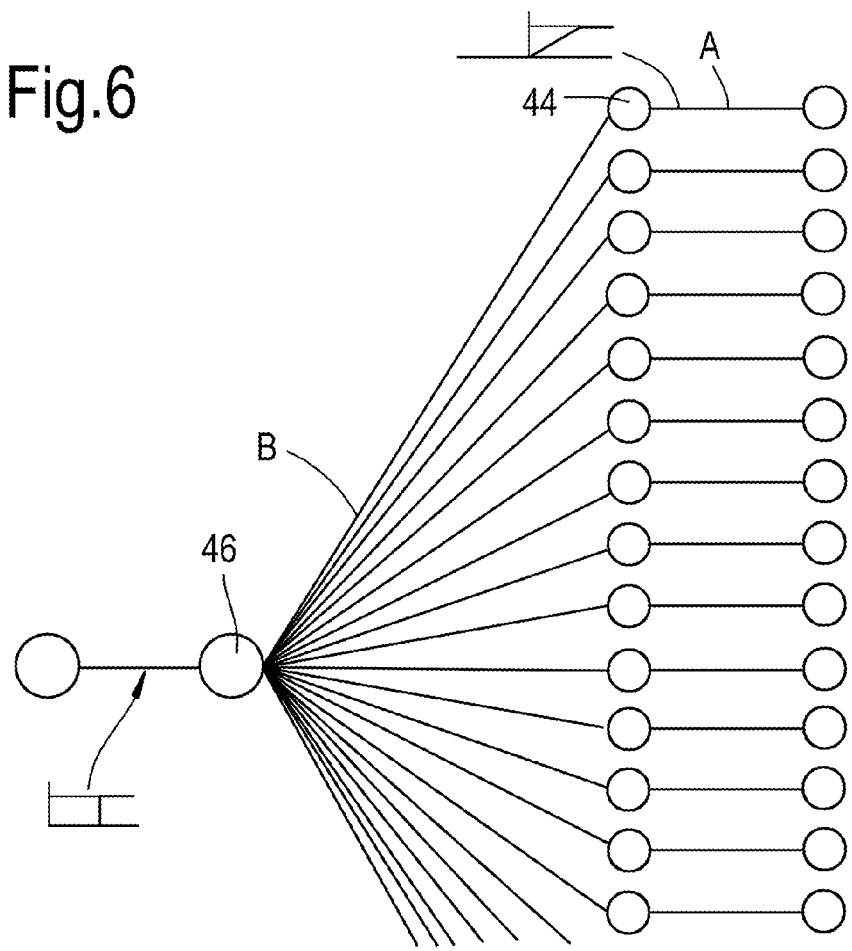
FIG. 6 shows the steps which may be used in determining one layer of structure according to FIG. 3; and, FIG. 7 shows a timeline for three different features which may be captured by the invention.

Turning to FIG. 6, the steps involved in the operation of the diagnostic tool are described. The feature data associated with each feature is received, retrieved or else generated by the processing means responsible for conducting the engine diagnosis. The feature data comprises the output confidence value for each parameter used in the diagnosis process, which may be determined in accordance with the multiple different exemplary methods described above. Given the multiple possible data sources, a data transform is applied to input confidence values at step A such that all input confidence values adhere to a standard scale and/or format for use by the diagnostic tool. This results in the confidence value associated with the feature nodes 44 in the network.

Such a normalisation procedure outputs a normalized feature which may be positive or negative to indicate the direction of change in a parameter, namely whether the parameter has increased or decreased. In this regard the tool can scan through the inputs and estimate the maximal values across the whole scanning range. For this purpose, a user may select a default normalisation function; no normalisation; or else a user-configurable normalisation based upon a reference table or other array. The default normalisation normalises any inputs to a scale between [−1, 1] as follows:

$$f(x) = \frac{e^{hx} - 1}{e^{hx} + 1}$$

Upon determination of the occurrence of a feature, for example by review and/or statistical analysis of the parameter data, the tool assesses whether the features which have been identified are indicative of a symptom at step B. In doing so, the tool processes the data associated with the feature nodes 44 linked with each symptom node 46 via links 50 along with the associated confidence values and time periods 60. This step may involve the summations of the weighted feature values. For example, if each feature is prescribed a value β and a weighting or confidence value w, then for a set of n features, a total confidence for the symptom can be expressed as:

$$\sum_{i=1}^{n} (\beta_i * w_i)$$

In order to assess whether or to what degree a symptom contributes towards the determination of a particular diagnosis 48 for the machine, a threshold transform is applied at step C to convert the summation of each node multiplied by its weighting to an output confidence value for the symptom 46. The threshold transform may be established by a user when creating the tool using the user interface 52

Thus it will be appreciated that all features are weight summarised into a single output. This output may then be normalised in the same manner as the input data and the same operation repeated for all symptoms linked to a diagnosis in order to result in a single output confidence value for a specific diagnosis. That is to say the process for converting inputs to an output for the feature layer is essentially the same as the process used to convert the inputs to the symptom layer to a single diagnosis confidence output.

For the sake of clarity, it is to be noted that the time range and offset criteria are also applied to the symptom values in order to ensure all relevant time-related symptoms are adequately captured within the diagnosis.

The diagnosis nodes 48 are configured and assembled by the diagnosis tool, typically within a control centre, at different layers in order to form the diagnosis network.

In view of the above description it will be appreciated that a definition of the present invention relies on the general concept of the application of confidence values to features determined from measured operational variables for a machine and the use of those confidence values to determine a weighting for a symptom and/or diagnosis derived therefrom. Such a method improves the qualitative nature of the diagnosis and the level of certainty which can be attributed to the diagnosis.

Upon diagnosis of a confidence value for a particular diagnosis which exceeds a threshold confidence value, the diagnosis tool may determine a status for the machine indicative of an unfavourable condition. Dependent on the diagnosis confidence value, a status may be generated which is advises of necessary servicing or repair work; which indicates that further use of the machine is prohibited; which indicates that certain components are required to be inspected and/or replaced; or else that a particular diagnosis is to be monitored during future use to determine whether the diagnosis confidence increases. Subsequent action based upon such determination can then be planned or scheduled.

Whilst the above examples refer to a number of specific ways in which confidence values can be determined, it will be appreciated to the person skilled in the art that a significant number of possible information sources exist which could have an impact on confidence values for either features or symptoms or diagnoses. Further examples of information sources identified for use in conjunction with an embodiment of the present invention include:

confidence output(s) from one or more feature detectors various delta to model outputs or residuals different feature detector confidence outputs for the same parameter (many feature detectors may be applied to one parameter)

other continuous or discrete machine data such as maintenance messages, cycle counts, BITE or error Codes or operational exceedance messages information which may make a diagnosis or symptom not true (such as maintenance message/action which may be in the form of binary format). In such instances, the associated weighting shall be configured as extreme high negative values such that confidence for the symptom is diminished.

Thermo-graphic image analysis results

Other analysis or modelling results such as thermodynamic, aerodynamic and/or stress analysis The embodiments of the invention described above provide the additional benefit that they can support prognostic capabilities. For example the recurrence of features and/or symptoms with low confidence levels may be used to determine potential faults or problems in the future. In addition, the tracking of confidence levels or weightings over time provides additional information which may be used to predict future trends in confidence levels. For example, a rising trend in confidence levels over time may be extended into the future to determine the point in time at which the diagnosis of a particular fault can be expected. Accordingly future potential faults may be determined and maintenance or repair work scheduled well in advance and with minimal disruption to the machine, engine or aircraft operator.

The nature of the confidence values determined for each diagnosis and associated symptoms allows continuous trending such that the severity of a fault can be assessed and used to determine fault prevention action.

Another limitation of known prior art approaches to EHM is that they have no intrinsic way of dealing with the temporal dimension of diagnostics. The inventors have determined that features might not present themselves at the same time and that certain features may only present after a certain time has elapsed from other features presenting themselves. The 'time window' in which other features may present may also be significant in the diagnostics, such that the rate of deterioration or prognosis may be determined, or else the time another feature presents may be fundamental in discriminating in the diagnosis itself.

The processing of the available operational variable sensor data as described above may be performed by a machine operation monitoring capability connected to the machine and in the vicinity thereof or else by a remote monitoring centre. Accordingly the method or tool defined in accordance with the present invention may otherwise be defined as a corresponding system. The determination of faults or potential faults may be communicated to the machine operator, such as an airline, for scheduling of corresponding or associated maintenance, servicing or repair work.

The invention claimed is:

1. A method for managing machine operation comprising:
defining a network relationship structure having three bands, the first band comprising possible features, the second band comprising possible symptoms and the third band comprising possible diagnoses, wherein the features are linked to symptoms and symptoms are linked to diagnoses, the network relationship structure being defined such that each single symptom is linked to one or a plurality of features and each single symptom is linked to one or a plurality of diagnoses;
sensing a plurality of operational variables for a machine during use thereof so as to generate operational data for said variables and store said operational data in a memory;
processing, using a hardware processor, said operational data so as to determine features within the operational data indicative of an abnormal event representing a divergence from a desired operational state;
determining a confidence value associated with said features;
assessing whether a plurality of features and associated confidence value are indicative of a predetermined diagnosis for said machine;
determining a confidence value for said diagnosis based upon the associated feature confidence value, the confidence value for said diagnosis being different from the associated feature confidence value; and
outputting a signal indicative of an operational state of the machine if the diagnosis confidence value exceeds a threshold diagnosis confidence.

2. A method according to claim 1, wherein
the features and diagnoses are represented as nodes within said network structure and links are formed there-between to identify which features impact on which diagnoses.

3. A method according to claim 1, wherein
assessing whether a plurality of features and associated confidence values are indicative of a predetermined diagnosis for said machine, comprises determining one or more symptom confidence values from the plurality of feature confidence values and assessing whether the one or more symptom confidence values are indicative of a predetermined diagnosis.

4. A method according to claim 3, wherein
the one or more symptom confidence values are representative of a summation or averaging of the feature confidence values related thereto.

5. A method according to claim 3, wherein
the diagnosis confidence value is representative of a summation or averaging of the symptom confidence values related thereto.

6. A method according to claim 1, wherein
feature confidence values are determined based upon a divergence of said operational data from a desired operational state beyond a predetermined threshold value or rate of change.

7. A method according to claim 1, wherein
feature confidence values are determined based upon divergence of operational data from a desired operational state for a plurality of operational variables.

8. A method according to claim 1, wherein
the determination of any or any combination of a feature, symptom and/or diagnosis confidence value comprises definition of a time period value associated with said feature, symptom or diagnosis.

9. A method according to claim 8, wherein
features occurring within the time period prescribed for another feature are determined to be linked and the determining of the confidence value for said associated diagnosis is based upon said linked feature confidence values.

10. A method according to claim 8, wherein
the processing said operational data comprises scanning for linked features which occur within said time period.

11. A method according to claim 1, comprising
scheduling testing, maintenance or repair work for said machine based upon the diagnosis confidence value.

12. A tool for diagnosis or prognosis of machine operation characteristics comprising:
one or more hardware processors arranged for data communication with a plurality of sensors, said sensors arranged to record a plurality of operational variables during use of a machine so as to generate machine operational data for said variables and store said operational data in a memory,
the one or more processors arranged to receive said machine operational data and to:
define a network relationship structure having three bands, the first band comprising possible features, the second band comprising possible symptoms and the third band comprising possible diagnoses, wherein the features are linked to symptoms and symptoms are linked to diagnoses, the network relationship structure being defined such that each single symptom is linked to one or a plurality of features and each single symptom is linked to one or a plurality of diagnoses;
control the processing of said operational data so as to determine features within the operational data indicative of an abnormal event representing a divergence from a desired operational state;
determine a confidence value associated with said features;
assess whether a plurality of features and associated confidence value are indicative of a predetermined diagnosis for said machine;
determine a confidence value for said diagnosis based upon the associated feature confidence value, the confidence value for said diagnosis being different from the associated feature confidence value; and
control the output of a signal indicative of an operational state of the machine dependent on the diagnosis confidence value.

13. A data carrier comprising non-transitory machine readable instruction for controlling operation of one or more processors to perform the processing steps of:
defining a network relationship structure having three band, the first band comprising possible features, the second band comprising possible symptoms and the third band comprising possible diagnoses, wherein the features are linked to symptoms and symptoms are linked to diagnosis, the network relationship structure being defined such that each single symptom is linked to one or a plurality of features and each single symptom is linked to one or a plurality of diagnoses;
receiving operational data for a plurality of operational variables for a machine;
determine features within the operational data indicative of an abnormal event representing a divergence from a desired operational state of said machine;
determining a confidence value associated with said features;

assessing whether a plurality of features and associated confidence value are indicative of a predetermined diagnosis for said machine; and determining a confidence value for said diagnosis based upon the associated feature confidence value, the confidence value for said diagnosis being different from the associated feature confidence value.

\* \* \* \* \*